United States Patent
Toyota et al.

(10) Patent No.: US 10,569,632 B2
(45) Date of Patent: Feb. 25, 2020

(54) HYBRID VEHICLE AND VEHICLE

(71) Applicant: MAZDA MOTOR CORPORATION, Aki-gun, Hiroshima (JP)

(72) Inventors: Hideo Toyota, Niihama (JP); Tomoo Sawazaki, Nagoya (JP); Yukiya Tanaka, Higashihiroshima (JP); Hiraku Nishikawa, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/084,951

(22) PCT Filed: Mar. 23, 2017

(86) PCT No.: PCT/JP2017/011591
§ 371 (c)(1),
(2) Date: Sep. 13, 2018

(87) PCT Pub. No.: WO2017/170078
PCT Pub. Date: Oct. 5, 2017

(65) Prior Publication Data
US 2019/0084395 A1    Mar. 21, 2019

(30) Foreign Application Priority Data

Mar. 29, 2016 (JP) ................. 2016-066360

(51) Int. Cl.
*B60K 1/00* (2006.01)
*B60K 6/26* (2007.10)
(Continued)

(52) U.S. Cl.
CPC ................. *B60K 1/00* (2013.01); *B60K 6/26* (2013.01); *B60K 6/36* (2013.01); *B60K 6/40* (2013.01);
(Continued)

(58) Field of Classification Search
CPC . B60K 1/00; B60K 1/04; B60K 23/08; B60K 5/04; B60K 6/36; B60K 6/26; B60K 6/52
See application file for complete search history.

(56) References Cited

U.S. PATENT DOCUMENTS 8,978,617 B2 * 3/2015 Matsuda ................. B60K 1/04
123/198 E
2002/0033293 A1 * 3/2002 Fukuda .............. B60K 23/0808
180/250
(Continued)

FOREIGN PATENT DOCUMENTS

DE    10314182 A1    11/2003
GB     2452062 A      2/2009
(Continued)

OTHER PUBLICATIONS

European Patent Office, Extended European Search Report Issued in Application No. 17774619.5, dated Jan. 25, 2019, 9 pages.

*Primary Examiner* — Hau V Phan
(74) *Attorney, Agent, or Firm* — Alleman Hall Creasman & Tuttle LLP

(57) ABSTRACT

A hybrid vehicle according to one aspect of the present invention is a hybrid vehicle including: an engine arranged at a vehicle body front portion; a propeller shaft configured to transmit an output of the engine to wheels arranged at a vehicle body rear portion; and a drive motor provided so as to drive the propeller shaft and supported with a vehicle body, and the propeller shaft transmits an output of the drive motor to wheels arranged at at least one of the vehicle body front portion and the vehicle body rear portion. The propeller shaft is supported with the vehicle body through the drive motor by a middle portion of the propeller shaft in the vehicle body front-rear direction being supported with the drive motor.

21 Claims, 7 Drawing Sheets

(51) Int. Cl.
*B60K 6/36* (2007.10)
*B60K 6/40* (2007.10)
*B60K 6/48* (2007.10)
*B60K 6/52* (2007.10)
*B60K 6/54* (2007.10)
*B60K 13/04* (2006.01)
*B60K 15/063* (2006.01)
*B60K 17/04* (2006.01)
*B60K 17/22* (2006.01)
*B60K 17/356* (2006.01)
*B60L 50/16* (2019.01)

(52) U.S. Cl.
CPC .............. *B60K 6/48* (2013.01); *B60K 6/52* (2013.01); *B60K 6/54* (2013.01); *B60K 13/04* (2013.01); *B60K 15/063* (2013.01); *B60K 17/04* (2013.01); *B60K 17/22* (2013.01); *B60K 17/356* (2013.01); *B60L 50/16* (2019.02); *B60K 2006/4808* (2013.01); *B60K 2006/4833* (2013.01); *Y02T 10/6221* (2013.01); *Y02T 10/6265* (2013.01); *Y02T 10/7077* (2013.01)

(56) References Cited

U.S. PATENT DOCUMENTS

| | | |
|---|---|---|
| 2003/0234124 A1 | 12/2003 | Pecnik et al. |
| 2004/0011576 A1 | 1/2004 | Taniguchi et al. |
| 2007/0193793 A1 | 8/2007 | Burrows et al. |
| 2009/0277711 A1* | 11/2009 | Hoffmann ........ B60K 23/0808 180/247 |
| 2011/0082004 A1* | 4/2011 | Kato ............... B60K 17/344 475/303 |
| 2011/0180339 A1* | 7/2011 | Kawamura ......... B60K 5/04 180/65.245 |
| 2014/0067218 A1* | 3/2014 | Stares .............. B60K 23/08 701/69 |
| 2014/0067219 A1* | 3/2014 | Stares .............. B60K 17/34 701/69 |
| 2014/0100750 A1* | 4/2014 | Stares .............. B60K 17/34 701/69 |
| 2014/0129105 A1* | 5/2014 | Shigeta ............ B60K 17/35 701/69 |
| 2014/0136062 A1* | 5/2014 | Mita ............... B60K 23/08 701/65 |
| 2014/0172258 A1* | 6/2014 | Mita ............... B60K 23/08 701/69 |
| 2014/0372014 A1* | 12/2014 | Hancock .......... F02N 11/0833 701/112 |
| 2015/0142280 A1* | 5/2015 | Tamoto ............ B60W 10/119 701/53 |
| 2015/0175148 A1* | 6/2015 | Chimner .......... B60W 50/082 701/69 |

FOREIGN PATENT DOCUMENTS

| | | |
|---|---|---|
| JP | 1199838 A | 4/1999 |
| JP | 2003237394 A | 8/2003 |
| JP | 200554823 A | 3/2005 |
| JP | 2007223588 A | 9/2007 |
| JP | 2012148749 A | 8/2012 |

\* cited by examiner

HYBRID VEHICLE AND VEHICLE

TECHNICAL FIELD

The present invention relates to a vehicle, such as a hybrid vehicle, including a propeller shaft extending in a vehicle body front-rear direction.

BACKGROUND ART

In recent years, a hybrid vehicle is put into practical use, which includes an engine and a drive motor as driving sources and is driven by at least one of an output of the engine and an output of the drive motor. Known is a hybrid vehicle, such as a four-wheel drive vehicle or a rear-wheel drive vehicle, in which: an engine is arranged at a vehicle body front portion; a rear wheel differential device is arranged at a vehicle body rear portion; and a propeller shaft is arranged so as to extend in a vehicle body front-rear direction.

For example, PTL 1 discloses a hybrid vehicle that is a four-wheel drive vehicle in which: an engine is arranged at a vehicle body front portion; a rear wheel differential device is arranged at a vehicle body rear portion; a propeller shaft is arranged so as to extend in a vehicle body front-rear direction; and a drive motor is arranged at a rear portion of the propeller shaft.

CITATION LIST

Patent Literature

PTL 1: Japanese Laid-Open Patent Application Publication No. 2007-223588

SUMMARY OF INVENTION

Technical Problem

According to the hybrid vehicle described in PTL 1, the propeller shaft is supported with a vehicle body through (i) a bearing portion rotatably supporting a middle portion of the propeller shaft and (ii) a support bracket through which the bearing portion is supported with the vehicle body, and the drive motor arranged at the rear portion of the propeller shaft is supported with the vehicle body. Therefore, to individually support the propeller shaft and the drive motor with the vehicle body, supporting parts, assembly man-hours, and the like increase. On this account, a support structure supporting the propeller shaft is desired to be made simple.

An object of the present invention is to, in a vehicle, such as a hybrid vehicle, including a propeller shaft extending in a vehicle body front-rear direction, simplify a support structure supporting the propeller shaft with a vehicle body of the vehicle.

Solution to Problem

To solve the above problems, the present invention is configured as below.

A first aspect of the present invention is a hybrid vehicle including: an engine arranged at one of a vehicle body front portion and a vehicle body rear portion; a propeller shaft extending in a vehicle body front-rear direction and configured to transmit an output of the engine to wheels arranged at the other of the vehicle body front portion and the vehicle body rear portion; and a drive motor provided so as to drive the propeller shaft and supported with the vehicle body, the propeller shaft transmitting an output of the drive motor to wheels which are arranged at at least one of the vehicle body front portion and the vehicle body rear portion, wherein the propeller shaft is supported with the vehicle body through the drive motor by a middle portion of the propeller shaft in the vehicle body front-rear direction being supported with the drive motor.

A second aspect of the present invention is configured such that: in the first aspect of the present invention, the drive motor includes a motor portion including a stator and a rotor, a casing portion accommodating the motor portion, and bearing portions provided at both respective vehicle body front-rear direction end portions of the casing portion; and the propeller shaft is inserted into and supported with the bearing portions, and with this, supported with the vehicle body through the drive motor.

A third aspect of the present invention is configured such that: in the second aspect of the present invention, the drive motor includes a speed reducer portion in the casing portion, the speed reducer portion being configured to decelerate rotation of the rotor of the motor portion and transmit the rotation of the rotor to the propeller shaft; and the motor portion and the speed reducer portion are provided on the propeller shaft so as to be lined up in the vehicle body front-rear direction.

A fourth aspect of the present invention is configured such that: in any one of the first to third aspects of the present invention, the hybrid vehicle is a four-wheel drive vehicle manufactured based on a front engine-front drive vehicle in which the engine is arranged at the vehicle body front portion, and the output of the engine is transmitted to wheels arranged at the vehicle body front portion; and the propeller shaft is provided so as to couple a transfer and a coupling, the transfer being provided on axles of the wheels arranged at the vehicle body front portion and being configured to take out driving force to be transmitted to wheels arranged at the vehicle body rear portion, the coupling being arranged at the vehicle body rear portion and being configured to adjust driving force to be distributed to the wheels arranged at the vehicle body front portion and the wheels arranged at the vehicle body rear portion.

A fifth aspect of the present invention is configured such that: in any one of the first to third aspects of the present invention, the hybrid vehicle is a front engine-rear drive vehicle in which the engine is arranged at the vehicle body front portion, and the output of the engine is transmitted to the wheels arranged at the vehicle body rear portion, or the hybrid vehicle is a four-wheel drive vehicle manufactured based on the front engine-rear drive vehicle; and the propeller shaft is provided so as to couple a transmission and a wheel differential device, the transmission being coupled to the engine and arranged at the vehicle body front portion, the wheel differential device being arranged at the vehicle body rear portion.

A sixth aspect of the present invention is configured such that: in any one of the first to fifth aspects of the present invention, the engine is arranged at the vehicle body front portion; an exhaust treatment device is provided at a vehicle body rear side of the engine; a fuel tank is provided at a vehicle body front side of axles of the wheels arranged at the vehicle body rear portion; and the drive motor is located between the exhaust treatment device and the fuel tank in a vehicle body front-rear direction and arranged inside a tunnel portion which is provided at a vehicle width direction middle portion of a floor panel and is open at a lower side of the tunnel portion.

A seventh aspect of the present invention is configured such that: in any one of the first to fifth aspects of the present invention, the engine is arranged at the vehicle body front portion; an exhaust treatment device is provided at a vehicle body rear side of the engine; a battery is provided at a vehicle body front side of axles of the wheels arranged at the vehicle body rear portion; and the drive motor is located between the exhaust treatment device and the battery in the vehicle body front-rear direction and arranged inside a tunnel portion which is provided at a vehicle width direction middle portion of a floor panel and is open at a lower side of the tunnel portion.

An eighth aspect of the present invention is a vehicle including: an engine arranged at one of a vehicle body front portion and a vehicle body rear portion; a propeller shaft extending in a vehicle body front-rear direction and configured to transmit an output of the engine to wheels arranged at the other of the vehicle body front portion and the vehicle body rear portion; and a power generator provided so as to be driven by the propeller shaft and supported with the vehicle body, wherein the propeller shaft is supported with the vehicle body through the power generator by a middle portion of the propeller shaft in the vehicle body front-rear direction being supported with the power generator.

Advantageous Effects of Invention

According to the first aspect of the present invention in the present application, the hybrid vehicle includes: the engine arranged at one of the vehicle body front portion and the vehicle body rear portion; the propeller shaft configured to transmit the output of the engine to the wheels arranged at the other of the vehicle body front portion and the vehicle body rear portion; and the drive motor provided so as to drive the propeller shaft and supported with the vehicle body. Further, the propeller shaft is supported with the vehicle body through the drive motor by the middle portion of the propeller shaft in the vehicle body front-rear direction being supported with the drive motor.

Thus, in the hybrid vehicle including the propeller shaft extending in the vehicle body front-rear direction, the propeller shaft is supported with the vehicle body through the drive motor supported with the vehicle body. Therefore, the support structure supporting the propeller shaft with the vehicle body is made simpler than a case where the propeller shaft and the drive motor are individually supported with the vehicle body. Further, since the middle portion of the propeller shaft in the vehicle body front-rear direction is supported, the propeller shaft is stably supported.

According to the second aspect of the present invention, the drive motor includes: the motor portion including the stator and the rotor; the casing portion accommodating the motor portion; and the bearing portions provided at both respective vehicle body front-rear direction end portions of the casing portion. Further, the propeller shaft is inserted into the bearing portions, and with this, supported with the vehicle body through the drive motor. Thus, the above effects are concretely realized.

According to the third aspect of the present invention, the drive motor includes the speed reducer portion in the casing portion, and the motor portion and the speed reducer portion are provided on the propeller shaft so as to be lined up in the vehicle body front-rear direction. With this, torque is increased by the speed reducer portion, and therefore, the drive motor is downsized. Further, since the motor portion and the speed reducer portion are arranged so as to be lined up, a radial size of the drive motor is reduced, and therefore, mountability of the drive motor onto the vehicle is improved.

According to the fourth aspect of the present invention, the hybrid vehicle is a four-wheel drive vehicle manufactured based on a front engine-front drive vehicle, and the propeller shaft is provided so as to couple the transfer arranged at the vehicle body front portion and the coupling arranged at the vehicle body rear portion. With this, in the engine transversely mounted type four-wheel drive hybrid vehicle, the above effects are effectively obtained.

According to the fifth aspect of the present invention, the hybrid vehicle is the front engine-rear drive vehicle or the four-wheel drive vehicle manufactured based on the front engine-rear drive vehicle, and the propeller shaft is provided so as to couple the transmission arranged at the vehicle body front portion and the wheel differential device arranged at the vehicle body rear portion. With this, in the engine longitudinally mounted type two-wheel or four-wheel hybrid vehicle, the above effects are effectively obtained.

According to the sixth aspect of the present invention, the drive motor is arranged inside the tunnel portion, provided at the floor panel, so as to be located between the exhaust treatment device and the fuel tank in the vehicle body front-rear direction. With this, in the hybrid vehicle in which: the exhaust treatment device is provided at the vehicle body rear side of the engine arranged at the vehicle body front portion; and the fuel tank is provided at the vehicle body front side of the axles of the wheels arranged at the vehicle body rear portion, the propeller shaft is stably supported by using the drive motor arranged between the exhaust treatment device and the fuel tank in the vehicle body front-rear direction.

According to the seventh aspect of the present invention, the drive motor is arranged inside the tunnel portion, provided at the floor panel, so as to be located between the exhaust treatment device and the battery in the vehicle body front-rear direction. With this, in the hybrid vehicle in which: the exhaust treatment device is provided at the vehicle body rear side of the engine arranged at the vehicle body front portion; and the battery is provided at the vehicle body front side of the axles of the wheels arranged at the vehicle body rear portion, the propeller shaft is stably supported by using the drive motor arranged between the exhaust treatment device and the battery in the vehicle body front-rear direction.

According to the eighth aspect of the present invention, the vehicle includes: the engine arranged at one of the vehicle body front portion and the vehicle body rear portion; the propeller shaft configured to transmit the output of the engine to the wheels arranged at the other of the vehicle body front portion and the vehicle body rear portion; and the power generator provided so as to be driven by the propeller shaft and supported with the vehicle body. Further, the propeller shaft is supported with the vehicle body through the power generator by the middle portion of the propeller shaft in the vehicle body front-rear direction being supported with the power generator.

With this, in the vehicle including the propeller shaft extending in the vehicle body front-rear direction, the propeller shaft is supported with the vehicle body through the power generator supported with the vehicle body. Therefore, the support structure supporting the propeller shaft with the vehicle body is made simpler than a case where the propeller shaft and the power generator are individually supported with the vehicle body. Further, since the middle portion of the propeller shaft in the vehicle body front-rear direction is supported, the propeller shaft is stably supported.

DESCRIPTION OF EMBODIMENTS

Hereinafter, embodiments of the present invention will be explained with reference to the attached drawings.

Figure 1:
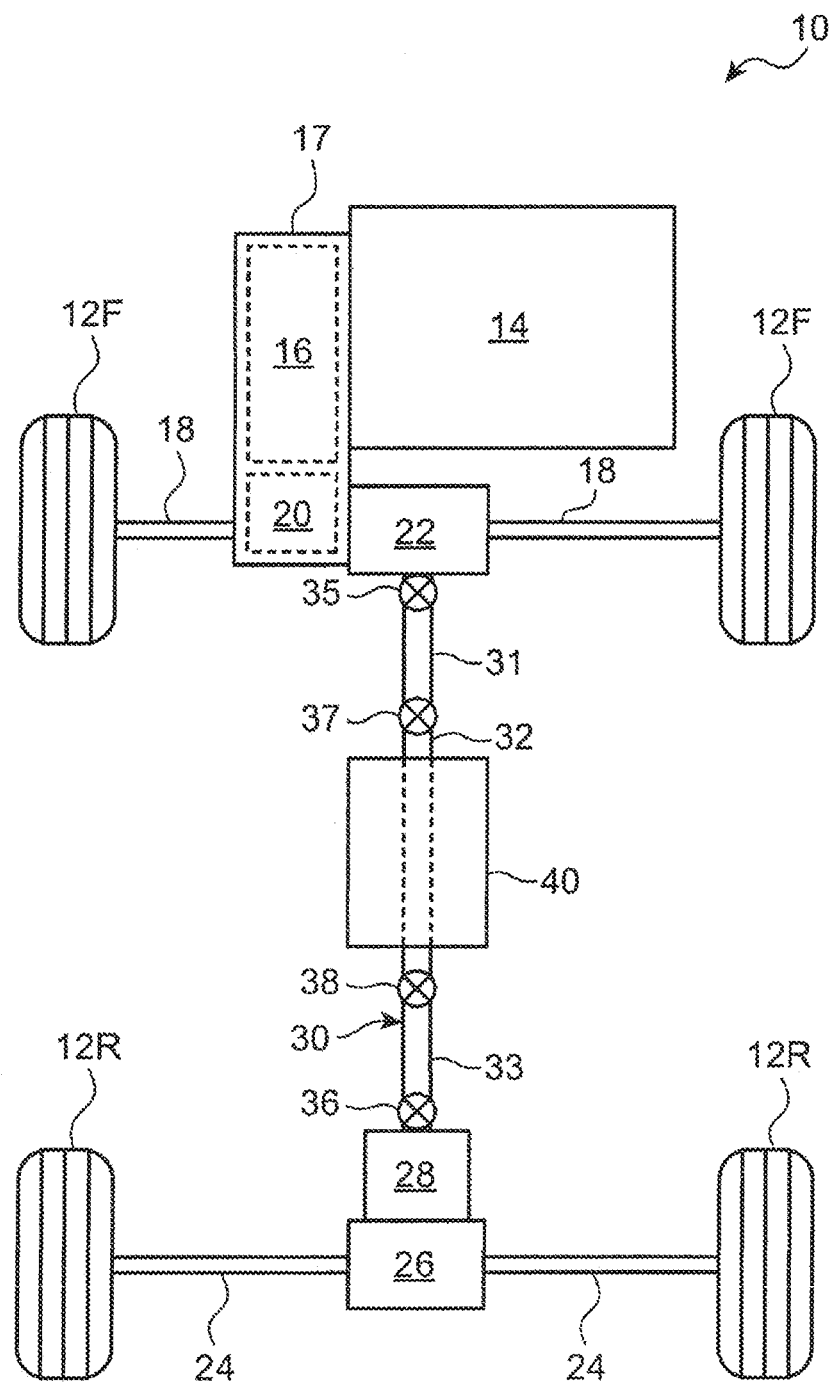
FIG. 1 is a diagram showing a schematic configuration of a hybrid vehicle according to Embodiment 1 of the present invention.

FIG. 1 is a diagram showing a schematic configuration of a hybrid vehicle according to Embodiment 1 of the present invention. The hybrid vehicle according to Embodiment 1 of the present invention is an engine transversely mounted type four-wheel drive vehicle manufactured based on a front engine-front drive vehicle in which: an engine is arranged at a vehicle body front portion; and an output of the engine is transmitted to wheels arranged at the vehicle body front portion.

As shown in FIG. 1, a vehicle body 10 of the hybrid vehicle according to Embodiment 1 of the present invention includes: an engine 14 arranged at the vehicle body front portion as a driving source; a transmission 16 coupled to the engine 14 and configured to transmit an output of the engine 14 to wheels (front wheels) 12F arranged at the vehicle body front portion and wheels (rear wheels) 12R arranged at a vehicle body rear portion; a front wheel differential device 20 configured to transmit driving force of the transmission 16 to the left and right front wheels 12F through axles 18; a transfer 22 arranged on the axles 18 of the front wheels 12F and configured to take out driving force to be transmitted to the rear wheels 12R; a propeller shaft 30 coupled to the transfer 22 and extending in a vehicle body front-rear direction; a coupling 28 coupled to the propeller shaft 30 at the vehicle body rear portion and configured to adjust the driving force to be distributed to the front wheels 12F and the rear wheels 12R; and a rear wheel differential device 26 coupled to the coupling 28 and configured to transmit the driving force of the transfer 22 to the left and right rear wheels 12R through axles 24. The transmission 16 and the front wheel differential device 20 are included in a transmission casing 17.

The vehicle body 10 further includes a drive motor 40 arranged at a vehicle body front-rear direction middle portion as a driving source. The drive motor 40 is provided so as to drive the propeller shaft 30. An output of the drive motor 40 is transmitted from the propeller shaft 30 through the coupling 28 and the rear wheel differential device 26 to the rear wheels 12R and also transmitted from the propeller shaft 30 through the transfer 22 and the front wheel differential device 20 to the front wheels 12F.

In the present embodiment, the output of the engine 14 is transmitted to the front wheels 12F and can also be transmitted to the rear wheels 12R, and the output of the drive motor 40 can be transmitted to at least one of the front wheels 12F and the rear wheels 12R. The operations of the engine 14 and the drive motor 40 are controlled by a control unit (not shown).

For example, an electromagnetic coupling is used as the coupling 28. Regarding at least one of the output of the engine 14 and the output of the drive motor 40, the coupling 28 is configured to adjust the driving force to be distributed to the front wheels 12F and the rear wheels 12R. The distribution of the driving force between the front wheels 12F and the rear wheels 12R by the coupling 28 is changeable within a range of front wheel:rear wheel=100:0 to 50:50. It should be noted that the operation of the coupling 28 is controlled by the control unit.

As described below, the propeller shaft 30 is arranged inside a tunnel portion together with the drive motor 40. The tunnel portion is provided at a vehicle width direction middle portion of a floor panel that is a vehicle body constituting member constituting a bottom surface of a vehicle room, and a lower side of the tunnel portion is open. A front end portion of the propeller shaft 30 is coupled to the transfer 22 through a first universal joint 35. A rear end portion of the propeller shaft 30 is coupled to the coupling 28 through a second universal joint 36.

The propeller shaft 30 is configured to be divided into a first divided shaft 31, a second divided shaft 32, and a third divided shaft 33, which are arranged in this order from a vehicle body front side. The first divided shaft 31 and the second divided shaft 32 are coupled to each other through a third universal joint 37. The second divided shaft 32 and the third divided shaft 33 are coupled to each other through a fourth universal joint 38.

A cross shaft joint is used as each of the first universal joint 35, the second universal joint 36, and the third universal joint 37. The universal joint (35, 36, 37) is configured to be able to bend a rotation axis of two members coupled by the universal joint (35, 36, 37). Further, the universal joint (35, 36, 37) is configured such that rotation can be transmitted between the two members coupled by the universal joint (35, 36, 37).

A slide type constant velocity ball joint is used as the fourth universal joint 38. The universal joint 38 is configured to be able to bend a rotation axis of two members coupled by the universal joint 38. Further, the universal joint 38 is configured such that rotation can be transmitted between the two members coupled by the universal joint 38. Furthermore, the universal joint 38 is configured such that at least a part of the universal joint 38 and one of the two members coupled by the universal joint 38 move toward and are fitted into the other of the two members, and with this, the entirety of the two members coupled by the universal joint 38 can be extended or contracted in an axial direction.

The drive motor 40 is arranged on a vehicle body front-rear direction middle portion of the propeller shaft 30, specifically on a vehicle body front-rear direction middle portion of the second divided shaft 32 of the propeller shaft 30. The propeller shaft 30 is supported with the vehicle body 10 through the drive motor 40 by the vehicle body front-rear direction middle portion of the propeller shaft 30, specifically the middle portion of the second divided shaft 32 being supported with the drive motor 40.

Figure 2:
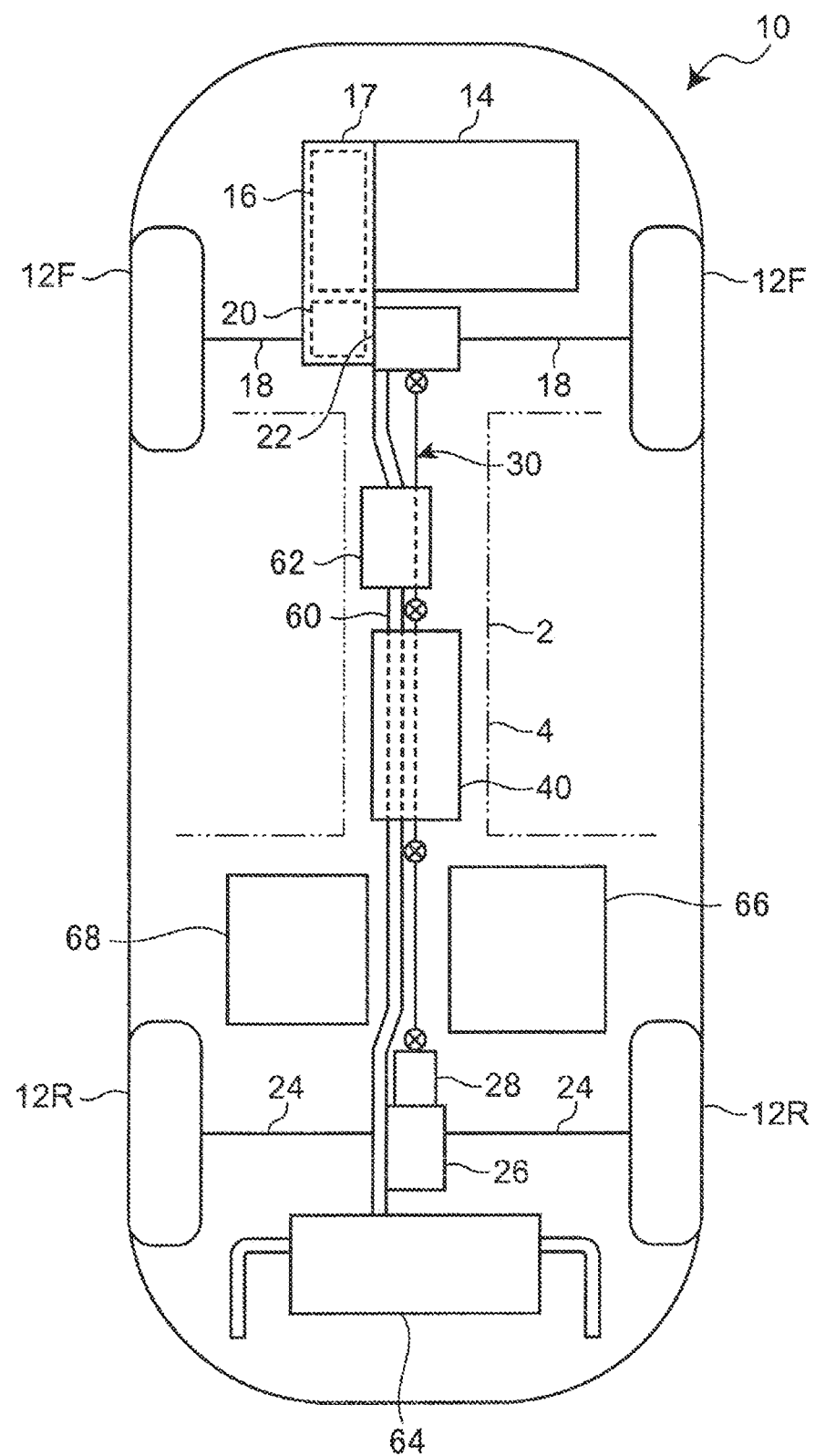
FIG. 2 is a diagram schematically showing the hybrid vehicle.

FIG. 2 is a diagram schematically showing the hybrid vehicle. As shown in FIG. 2, the vehicle body 10 further includes an exhaust pipe 60 extending from the engine 14 toward a vehicle body rear side. The exhaust pipe 60 is arranged inside a tunnel portion 4 of a floor panel 2 in the vicinity of the propeller shaft 30.

At the vehicle body rear side of the engine 14, a GPF (gasoline particulate filter) 62 and a silencer 64 are arranged at the exhaust pipe 60 in this order from the vehicle body front side. As an exhaust treatment device configured to treat an exhaust gas of the engine 14, the GPF (gasoline particulate filter) 62 collects particulate matters (PM) contained in the exhaust gas. The silencer 64 reduces sound generated when the exhaust gas is discharged to the atmosphere.

The GPF 62 is arranged inside the tunnel portion 4 of the floor panel 2 and located between the transfer 22 and the drive motor 40 in the vehicle body front-rear direction. The silencer 64 is arranged at the vehicle body rear portion so as to be located at a vehicle body rear side of the rear wheel differential device 26.

The vehicle body 10 includes: a fuel tank 66 configured to store fuel to be supplied to the engine 14; and a battery 68 configured to store electric power to be supplied to the drive motor 40. The drive motor 40 is configured to be driven by the propeller shaft 30. At the time of deceleration of the vehicle, the drive motor 40 can perform regenerative power generation by being driven by the propeller shaft 30 and supply the generated electric power to the battery 68.

The fuel tank 66 and the battery 68 are arranged at the vehicle body front side of the axles 24 of the rear wheels 12R and located between the drive motor 40 and the coupling 28 in the vehicle body front-rear direction. The fuel tank 66 and the battery 68 are arranged at the vehicle body rear portion so as to be lined up in a vehicle width direction.

In the present embodiment, the drive motor 40 is arranged inside the tunnel portion 4, provided at the vehicle width direction middle portion of the floor panel 2, so as to be located between the GPF 62 and the fuel tank 66 in the vehicle body front-rear direction. Further, the drive motor 40 is arranged inside the tunnel portion 4, provided at the vehicle width direction middle portion of the floor panel 2, so as to be located between the GPF 62 and the battery 68 in the vehicle body front-rear direction.

Next, a support structure supporting the drive motor 40 and the propeller shaft 30 with the vehicle body 10 will be explained.

Figure 3:
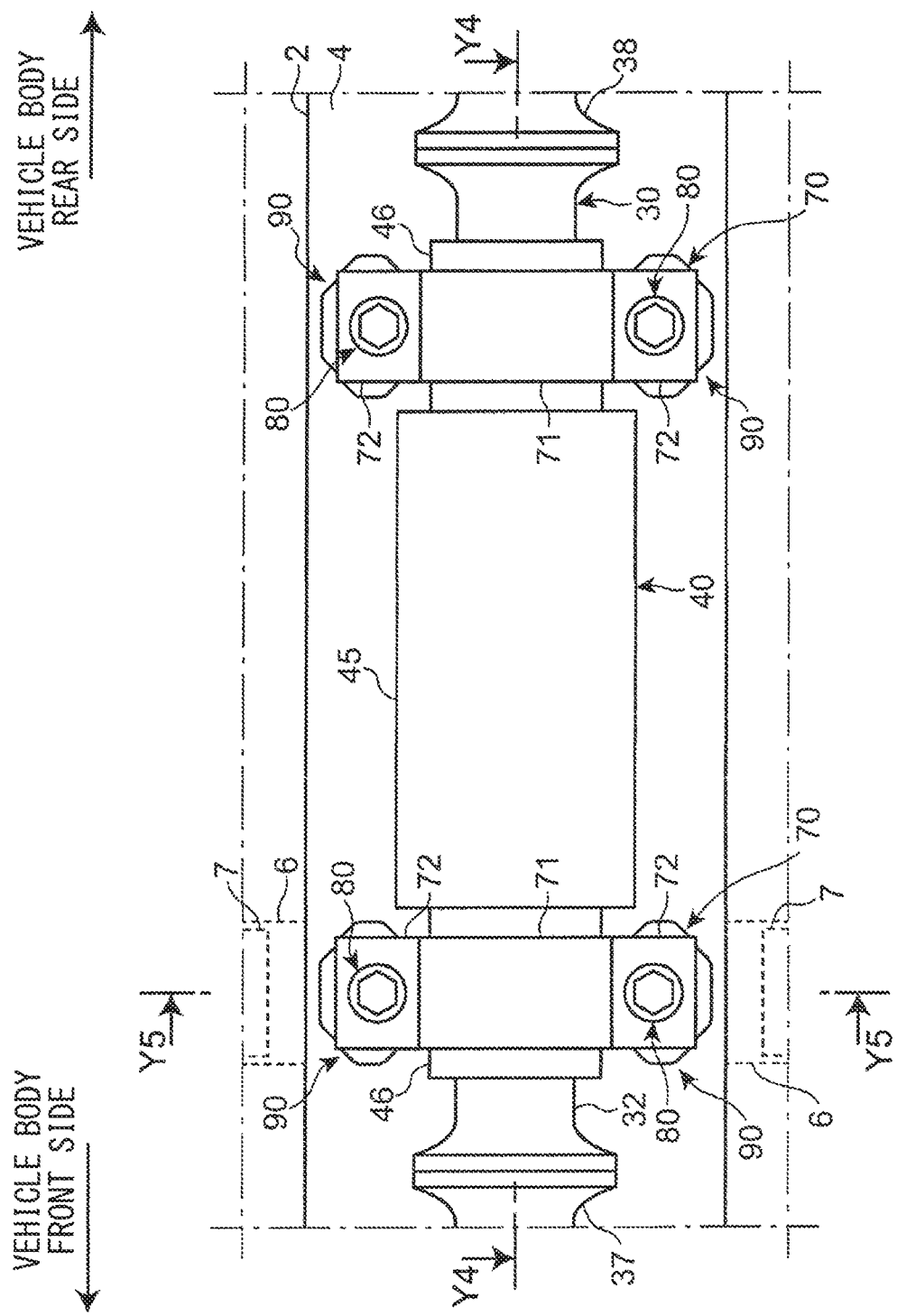
FIG. 3 is a bottom view showing a drive motor of the hybrid vehicle and its vicinity.
Figure 4:
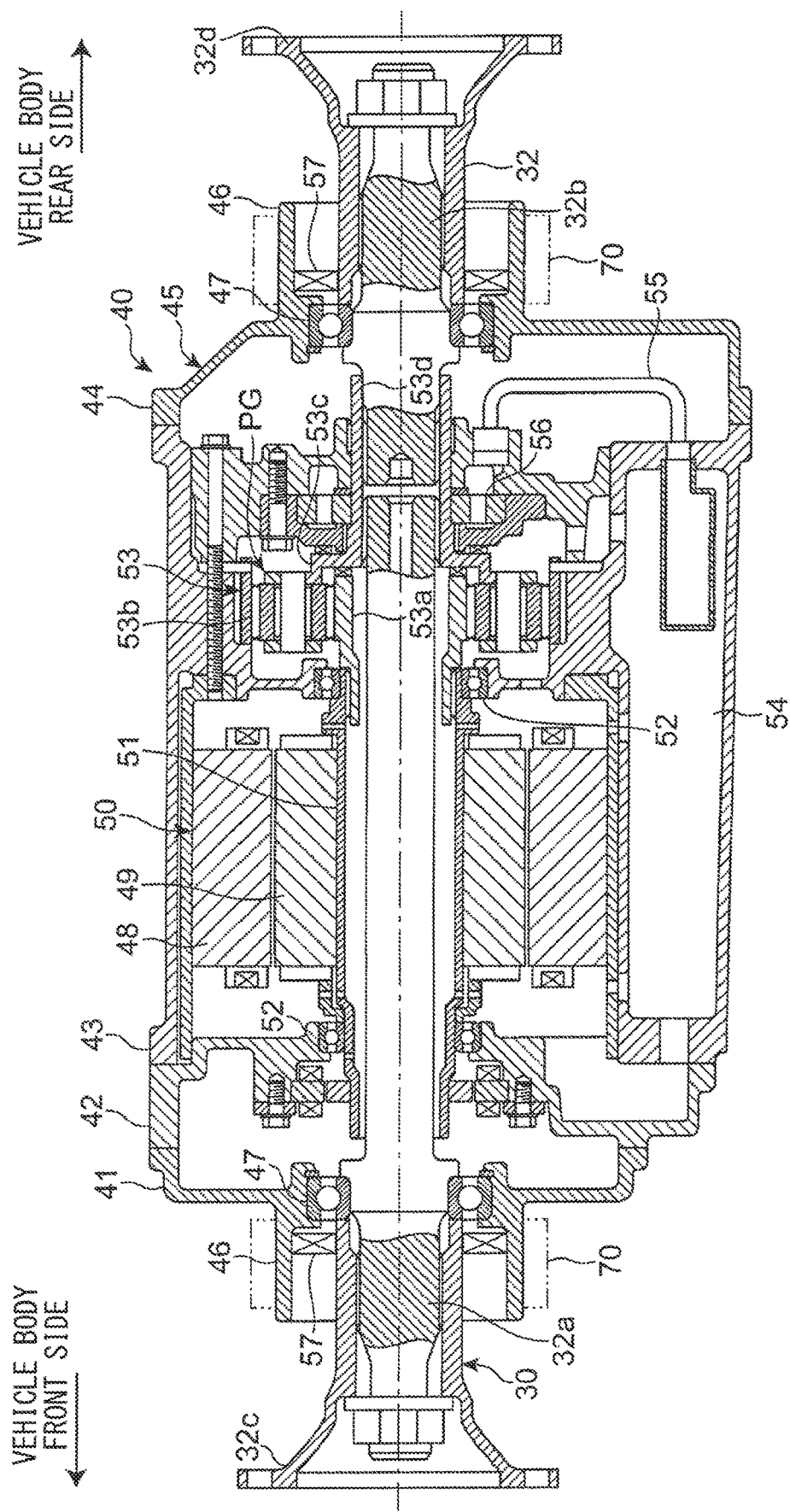
FIG. 4 is a sectional view taken along line Y4-Y4 of FIG. 3 and showing the hybrid vehicle.
Figure 5:
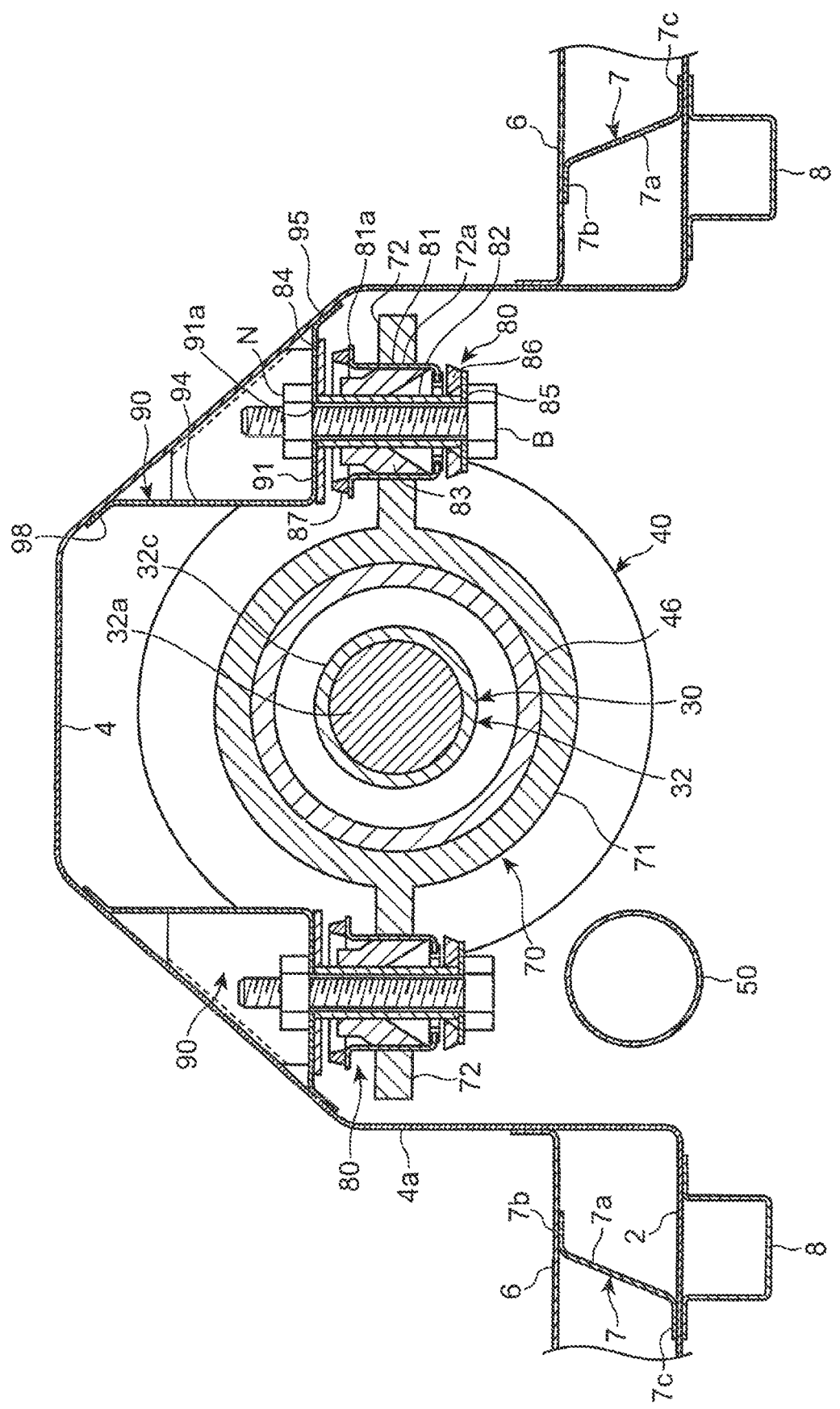
FIG. 5 is a sectional view taken along line Y5-Y5 of FIG. 3 and showing the hybrid vehicle.
Figure 6:
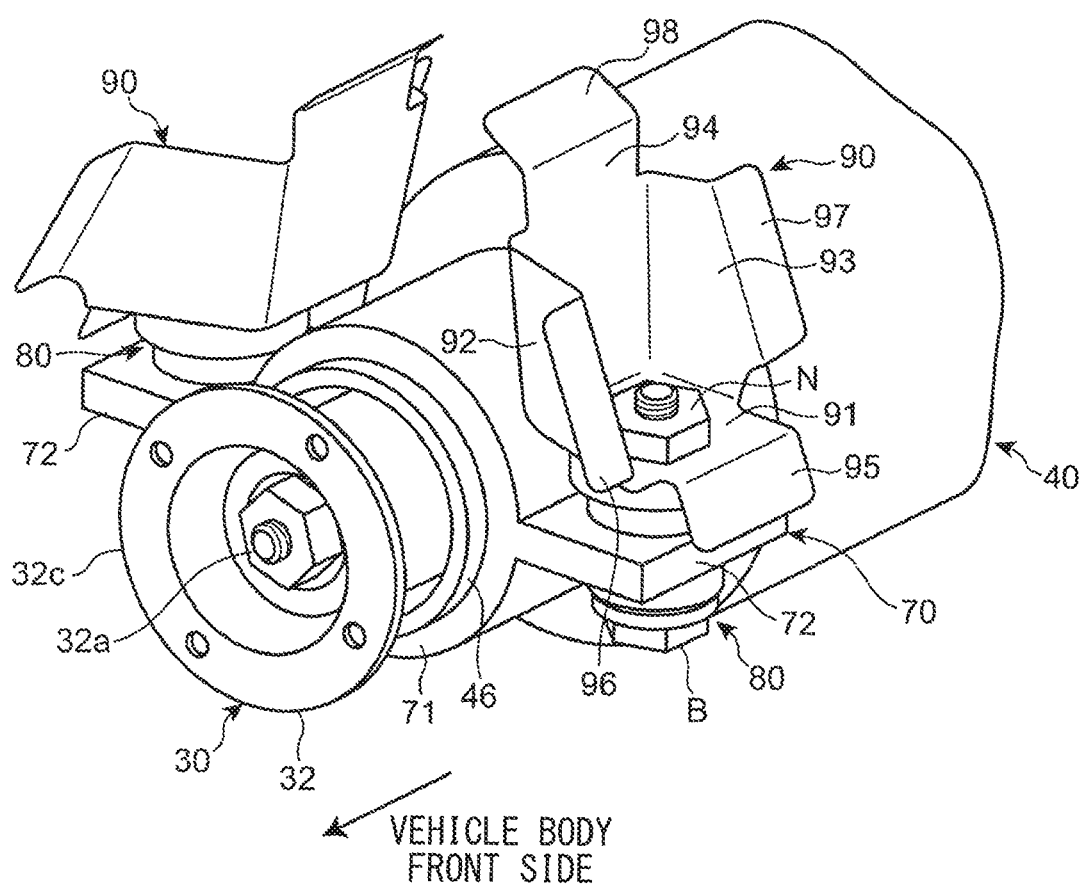
FIG. 6 is a diagram showing a support structure supporting the drive motor.

FIG. 3 is a bottom view showing the drive motor of the hybrid vehicle and its vicinity. FIG. 4 is a sectional view taken along line Y4-Y4 of FIG. 3 and showing the hybrid vehicle. FIG. 5 is a sectional view taken along line Y5-Y5 of FIG. 3 and showing the hybrid vehicle. FIG. 6 is a diagram showing a support structure supporting the drive motor.

As shown in FIG. 3, the drive motor 40 and the propeller shaft 30 are arranged inside the tunnel portion 4 of the floor panel 2. In the vehicle body 10, the second divided shaft 32 of the propeller shaft 30 penetrates the drive motor 40 and is supported with the drive motor 40, and the drive motor 40 is supported with the tunnel portion 4 of the floor panel 2 through support brackets 70 supporting both respective vehicle body front-rear direction end portions of the drive motor 40.

As shown in FIG. 4, the drive motor 40 includes a casing portion 45 configured to be divided into a first casing member 41, a second casing member 42, a third casing member 43, and a fourth casing member 44. Tubular portions 46 are provided at both respective vehicle body front-rear direction end portions of the casing portion 45 so as to extend toward the vehicle body front side and the vehicle body rear side, respectively.

Bearing portions 47 are provided at respective inner peripheral surfaces of both vehicle body front-rear direction end portions of the casing portion 45. The second divided shaft 32 of the propeller shaft 30 are inserted into and supported with the bearing portions 47. The second divided shaft 32 is configured to be divided into a first shaft 32a located at the vehicle body front side and a second shaft 32b located at the vehicle body rear side. The first shaft 32a is rotatably supported with the bearing portion 47 provided at the vehicle body front side of the casing portion 45, and the second shaft 32b is rotatably supported with the bearing portion 47 provided at the vehicle body rear side of the casing portion 45.

The second divided shaft 32 includes: a coupling member 32c splined to the vehicle body front side of the first shaft 32a; and a coupling member 32d splined to the vehicle body rear side of the second shaft 32b. The coupling member 32c coupled to the first shaft 32a is coupled to the third universal joint 37, and the coupling member 32d coupled to the second shaft 32b is coupled to the fourth universal joint 38.

The drive motor 40 further includes a motor portion 50 in the casing portion 45. The motor portion 50 includes: a stator 48 fixed to the casing portion 45; and a rotor 49 arranged at a radially inner side of the stator 48. A rotor shaft 51 is fixed to a radially inner side of the rotor 49 of the motor portion 50 so as to rotate integrally with the rotor 49.

The stator 48 is configured by winding a plurality of coils around a stator core formed by a magnetic body. The rotor 49 is formed by a tubular magnetic body and rotates by magnetic force generated when electric power is supplied to the stator 48.

The rotor shaft 51 is externally fitted to the second divided shaft 32 of the propeller shaft 30. Both vehicle body front-rear direction end portions of the rotor shaft 51 are supported through respective bearing portions 52 with the casing portion 45, specifically with the second casing member 42 and the third casing member 43, respectively, such that the rotor shaft 51 is rotatable.

The drive motor 40 further includes a speed reducer portion 53 in the casing portion 45. The speed reducer portion 53 decelerates rotation of the rotor 49 of the motor portion 50 and then transmits the rotation to the propeller shaft 30. The speed reducer portion 53 is arranged at the vehicle body rear side of the motor portion 50. The speed reducer portion 53 and the motor portion 50 are arranged on the propeller shaft 30 so as to be lined up in the vehicle body front-rear direction.

The speed reducer portion 53 includes a planetary gear set (planetary gear mechanism) PG. The planetary gear set PG is a single pinion type in which a pinion supported with a carrier directly meshes with a sun gear and a ring gear. As rotational elements, the planetary gear set PG includes a sun gear 53a, a ring gear 53b, and a carrier 53c.

The sun gear 53a is splined to the rotor shaft 51 arranged at the vehicle body front side and rotates integrally with the rotor shaft 51. The ring gear 53b is splined and fixed to the casing portion 45, specifically to the third casing member 43. The carrier 53c includes a sleeve 53d extending toward the vehicle body rear side, and the sleeve 53d is splined to the first shaft 32a and the second shaft 32b. The carrier 53c rotates integrally with the first shaft 32a and the second shaft 32b. With this, the rotation of the rotor 49 is decelerated by the speed reducer portion 53 and then transmitted to the propeller shaft 30.

The drive motor 40 further includes an oil storage portion 54 in the casing portion 45. The oil storage portion 54 stores oil for cooling the motor portion 50 and lubricating the speed reducer portion 53, the bearing portions 47 and 52, and the like. The oil stored in the oil storage portion 54 is supplied through an oil passage 55 to a gear type oil pump 56 provided at the vehicle body rear side of the speed reducer portion 53. The oil is supplied from the oil pump 56 to lubricated portions of the drive motor 40. In the drive motor 40, oil seals 57 are provided at both respective vehicle body front-rear direction end portions of the casing portion 45 so as to be located at the vehicle body front side of the corresponding bearing portion 47 and the vehicle body rear side of the corresponding bearing portion 47, respectively. With this, the oil is sealed in the casing portion 45.

The vehicle body 10 further includes the support brackets 70 through which the drive motor 40 is supported with the vehicle body. The tubular portions 46 provided at both respective vehicle body front-rear direction end portions of the casing portion 45 are supported with the tunnel portion 4 of the floor panel 2 of the vehicle body through the support brackets 70.

FIGS. 5 and 6 show the support structure at the vehicle body front side of the drive motor 40. As shown in FIGS. 5 and 6, the support bracket 70 includes a cylindrical portion 71 and two flange portions 72. The cylindrical portion 71 is press-fitted to an outer periphery of the tubular portion 46 provided at the casing portion 45 of the drive motor 40. The two flange portions 72 extend from the cylindrical portion 71 in a radially outer direction that is a horizontal direction. The cylindrical portion 71 and the two flange portions 72 are formed integrally. Opening portions 72a are formed at the respective flange portions 72 of the support bracket 70 so as to penetrate the respective flange portions 72. Mount members 80 are fixed and attached to the respective opening portions 72a.

Each of the mount members 80 includes a tubular outer tube member 81, a tubular inner tube member 82, and a tubular elastic member 83 provided between the outer tube member 81 and the inner tube member 82 and coupled to the outer tube member 81 and the inner tube member 82.

The inner tube member 82 is made of a metal material. An annular upper plate member 84 and an annular lower plate member 85 each extending in a radially outer direction are coupled to both respective axial end portions of the inner tube member 82. An annular elastic body 86 made of an elastic material, such as rubber, is fixed and attached to a side of the lower plate member 85 which side is closer to the upper plate member 84.

The outer tube member 81 is made of a metal material and arranged between the upper plate member 84 and the lower plate member 85. Further, the outer tube member 81 is inserted into the opening portion 72a of the flange portion 72 of the support bracket 70 and coupled to the flange portion 72 by welding or the like. The outer tube member 81 includes a flange portion 81a extending in a radially outer direction and located at an end portion thereof which portion is closer to the upper plate member 84 coupled to the inner tube member 82. An annular elastic body 87 made of an elastic material, such as rubber, is fixed and attached to a side of the flange portion 81a which side is closer to the upper plate member 84.

The elastic member 83 is made of an elastic material, such as rubber, and arranged between the upper plate member 84 and the lower plate member 85. An outer peripheral side of the elastic member 83 is coupled to the outer tube member 81, and an inner peripheral side of the elastic member 83 is coupled to the inner tube member 82. The inner tube member 82 of the mount member 80 is fixed and attached to the tunnel portion 4 of the floor panel 2 through a mounting bracket 90.

As shown in FIG. 6, the mounting bracket 90 includes: a bottom surface portion 91 extending in a substantially horizontal direction and having a substantially rectangular shape; a front vertical surface portion 92 extending from the vehicle body front side of the bottom surface portion 91 upward in a substantially vertical direction; a rear vertical surface portion 93 extending from the vehicle body rear side of the bottom surface portion 91 in the substantially vertical direction; and an inner vertical surface portion 94 extending from a vehicle width direction inner side of the bottom surface portion 91 in the substantially vertical direction. As shown in FIG. 5, a bolt insertion hole 91a is formed at a substantially middle of the bottom surface portion 91, and a nut N is welded to an upper side of the bottom surface portion 91 so as to correspond to the bolt insertion hole 91a.

The mounting bracket 90 further includes: a flange portion 95 extending downward from a vehicle width direction outer side of the bottom surface portion 91 along the tunnel portion 4 of the floor panel 2; a flange portion 96 extending toward the vehicle body front side from a vehicle width direction outer side of the front vertical surface portion 92 along the tunnel portion 4 of the floor panel 2; a flange portion 97 extending toward the vehicle body rear side from a vehicle width direction outer side of the rear vertical surface portion 93 along the tunnel portion 4 of the floor panel 2; and a flange portion 98 extending upward from an upper side of the inner vertical surface portion 94 along the tunnel portion 4 of the floor panel 2.

As shown in FIG. 6, the mount member 80 fixed to the flange portion 72 of the support bracket 70 is attached to the bottom surface portion 91 of the mounting bracket 90 by: stacking the upper plate member 84 on the bottom surface portion 91 of the mounting bracket 90; and then inserting a fastening bolt B into the inner tube member 82 and the bolt insertion hole 91a from a lower side of the lower plate member 85 and threadedly engaging the fastening bolt B with the nut N.

The mounting bracket 90 including the bottom surface portion 91 to which the mount member 80 is attached is attached to the vehicle body 10 by joining the flange portions 95, 96, 97, and 98 of the mounting bracket 90 to the tunnel portion 4 of the floor panel 2 by welding or the like.

The mount members 80 fixed to the respective flange portions 72 of the support bracket 70 are attached to the vehicle body 10 through the respective mounting brackets 90. With this, the vehicle body front side of the drive motor 40 is supported with the vehicle body 10.

At the vehicle body rear side of the drive motor 40, as with the vehicle body front side of the drive motor 40, the tubular portion 46 provided at the vehicle body rear side end portion of the casing portion 45 is supported with the support bracket 70, and the mount members 80 fixed to the respective flange portions 72 of the support bracket 70 are attached to the vehicle body 10 through the respective mounting brackets 90. With this, the vehicle body rear side of the drive motor 40 is supported with the vehicle body 10.

Thus, the propeller shaft 30, specifically the vehicle body front-rear direction middle portion of the second divided shaft 32 is rotatably supported with the casing portion 45 of the drive motor 40, and the drive motor 40 is supported with the vehicle body 10. The propeller shaft 30 is supported with the vehicle body 10 through the drive motor 40 by the vehicle body front-rear direction middle portion of the propeller shaft 30 being supported with the drive motor 40.

As shown in FIGS. 3 and 5, in the vehicle body 10, floor cross members 6 each having a hat-shaped section are joined to both respective vehicle width direction sides of the tunnel portion 4 of the floor panel 2 so as to extend in the vehicle width direction. Reinforcing members 7 are provided in the respective floor cross members 6. Each of the reinforcing members 7 includes a dividing surface portion 7a dividing the inside of the floor cross member 6. The reinforcing member 7 reinforces the floor panel 2 by joining flange portions 7b and 7c of the reinforcing member 7 to the floor cross member 6 and the floor panel 2, respectively. The flange portions 7b and 7c are provided at respective upper-side and lower-side portions of the dividing surface portion 7a.

As shown in FIG. 5, tunnel frames 8 each having a hat-shaped section are arranged at both respective vehicle width direction sides of the tunnel portion 4 of the floor panel 2 and joined to a lower surface of the floor panel 2 so as to extend in the vehicle body front-rear direction. Thus, the tunnel frames 8 reinforce the floor panel 2.

In the present embodiment, the propeller shaft 30 is configured to be divided into the three divided shafts 31, 32, and 33. However, the propeller shaft 30 may be configured by one shaft. Even in such a case, the drive motor 40 is arranged on the vehicle body front-rear direction middle portion of the propeller shaft 30, and the vehicle body front-rear direction middle portion of the propeller shaft 30 is supported with the drive motor 40, and with this, supported with the vehicle body 10 through the drive motor 40.

According to the present embodiment, in the hybrid vehicle 10 including: the engine 14 arranged at the vehicle body front portion; the propeller shaft 30 configured to transmit the output of the engine 14 to the rear wheels 12R; and the drive motor 40 provided so as to drive the propeller shaft 30 and supported with the vehicle body 10, the propeller shaft 30 is supported with the drive motor 40, and with this, supported with the vehicle body 10 through the drive motor 40. Similarly, in a hybrid vehicle including: an engine arranged at a vehicle body rear portion; a propeller shaft configured to transmit an output of the engine to front wheels; and a drive motor provided so as to drive the propeller shaft and supported with a vehicle body, the propeller shaft can be supported with the drive motor, and with this, supported with the vehicle body through the drive motor.

As above, the hybrid vehicle 10 according to the present embodiment includes: the engine 14 arranged at one of the vehicle body front portion and the vehicle body rear portion; the propeller shaft 30 configured to transmit the output of the engine 14 to the wheels 12R arranged at the other of the vehicle body front portion and the vehicle body rear portion; and the drive motor 40 provided so as to drive the propeller shaft 30 and supported with the vehicle body 10. The propeller shaft 30 is supported with the vehicle body 10 through the drive motor 40 by the vehicle body front-rear direction middle portion of the propeller shaft 30 being supported with the drive motor 40.

Thus, in the hybrid vehicle 10 including the propeller shaft 30 extending in the vehicle body front-rear direction, the propeller shaft 30 is supported with the vehicle body 10 through the drive motor 40 supported with the vehicle body 10. Therefore, the support structure supporting the propeller shaft 30 with the vehicle body 10 is made simpler than a case where the propeller shaft and the drive motor are individually supported with the vehicle body. Further, since the vehicle body front-rear direction middle portion of the propeller shaft 30 is supported, the propeller shaft 30 is stably supported.

Further, the drive motor 40 includes the speed reducer portion 53 in the casing portion 45, and the motor portion 50 and the speed reducer portion 53 are provided on the propeller shaft 30 so as to be lined up in the vehicle body front-rear direction. With this, torque is increased by the speed reducer portion 53, and therefore, the drive motor 40 is downsized. Further, since the motor portion 50 and the speed reducer portion 53 are arranged so as to be lined up, a radial size of the drive motor 40 is reduced, and therefore, mountability of the drive motor 40 onto the vehicle is improved.

Further, the drive motor 40 is arranged inside the tunnel portion 4, provided at the floor panel 2, so as to be located between the exhaust treatment device 62 and the fuel tank 66 in the vehicle body front-rear direction. With this, in the hybrid vehicle 10 in which: the exhaust treatment device 62 is provided at the vehicle body rear side of the engine 14 arranged at the vehicle body front portion; and the fuel tank 66 is provided at the vehicle body front side of the axles 24 of the wheels 12R arranged at the vehicle body rear portion, the propeller shaft 30 is stably supported by using the drive motor 40 arranged between the exhaust treatment device 62 and the fuel tank 66 in the vehicle body front-rear direction.

Further, the drive motor 40 is arranged inside the tunnel portion 4, provided at the floor panel 2, so as to be located between the exhaust treatment device 62 and the battery 68 in the vehicle body front-rear direction. With this, in the hybrid vehicle 10 in which: the exhaust treatment device 62 is provided at the vehicle body rear side of the engine 14 arranged at the vehicle body front portion; and the battery 68 is provided at the vehicle body front side of the axles 24 of the wheels 12R arranged at the vehicle body rear portion, the propeller shaft 30 is stably supported by using the drive motor 40 arranged between the exhaust treatment device 62 and the battery 68 in the vehicle body front-rear direction.

According to the present embodiment, in the hybrid vehicle 10 including the propeller shaft 30 extending in the vehicle body front-rear direction, the propeller shaft 30 is supported with the vehicle body 10 through the drive motor 40 by the middle portion of the propeller shaft 30 being supported with the drive motor 40. However, in a vehicle including a power generator instead of the drive motor 40, the propeller shaft can be supported with the power generator, and with this, supported with the vehicle body through the power generator.

As above, in the vehicle including: the engine 14 arranged at one of the vehicle body front portion and the vehicle body rear portion; the propeller shaft 30 configured to transmit the output of the engine 14 to the wheels 12R arranged at the other of the vehicle body front portion and the vehicle body rear portion; and the power generator provided so as to be driven by the propeller shaft 30 and supported with the vehicle body 10, the propeller shaft 30 can be supported with the vehicle body 10 through the power generator by the vehicle body front-rear direction middle portion of the propeller shaft 30 being supported with the power generator.

Even in this case, in the vehicle including the propeller shaft extending in the vehicle body front-rear direction, the propeller shaft is supported with the vehicle body through the power generator supported with the vehicle body. Therefore, the support structure supporting the propeller shaft with the vehicle body is made simpler than a case where the propeller shaft and the power generator are individually supported with the vehicle body. Further, since the vehicle body front-rear direction middle portion of the propeller shaft is supported, the propeller shaft is stably supported.

The hybrid vehicle 10 according to Embodiment 1 is a four-wheel drive vehicle manufactured based on a front engine-front drive vehicle. However, even in a four-wheel drive vehicle manufactured based on a front engine-rear drive vehicle, the propeller shaft can be supported with the vehicle body through the drive motor as with the above case.

Figure 7:
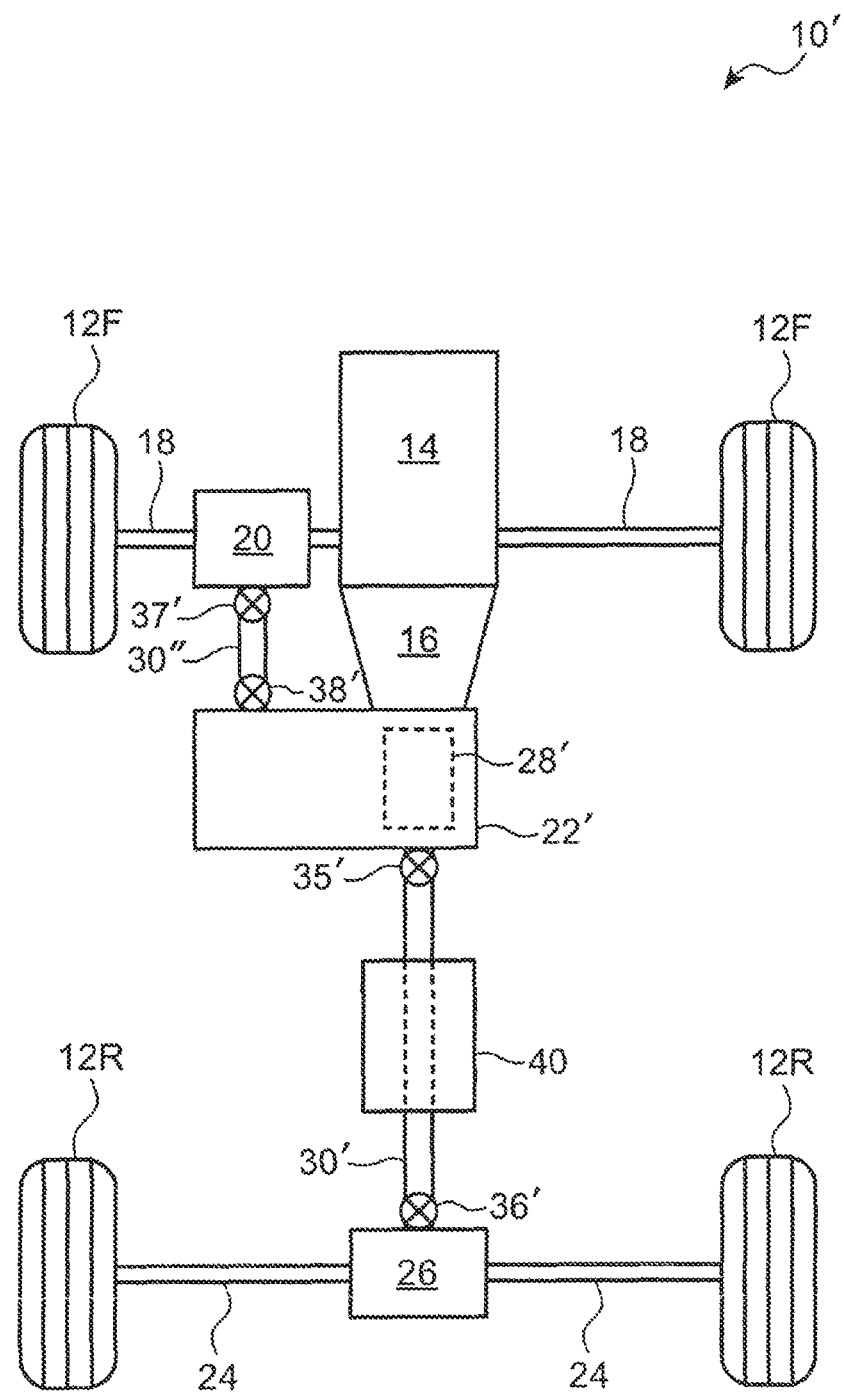
FIG. 7 is a diagram showing a schematic configuration of the hybrid vehicle according to Embodiment 2 of the present invention.

FIG. 7 is a diagram showing a schematic configuration of the hybrid vehicle according to Embodiment 2 of the present invention. The hybrid vehicle according to Embodiment 2 of the present invention is an engine longitudinally mounted type four-wheel drive vehicle manufactured based on a front engine-rear drive vehicle in which: the engine is arranged at the vehicle body front portion; and the output of the engine is transmitted to the wheels arranged at the vehicle body rear portion. In Embodiment 2, the same reference signs are used for the same components as the hybrid vehicle according to Embodiment 1, and a repetition of the same explanation is avoided.

As shown in FIG. 7, a vehicle body 10' of the hybrid vehicle according to Embodiment 2 of the present invention includes: the engine 14 arranged at the vehicle body front portion as the driving source; the transmission 16 coupled to the engine 14 and configured to transmit the output of the engine 14 to the front wheels 12F and the rear wheels 12R; the rear wheel differential device 26 configured to transmit the driving force of the transmission 16 to the left and right rear wheels 12R through the axles 24; and a rear propeller shaft 30' coupling the transmission 16 and the rear wheel differential device 26 and extending in the vehicle body front-rear direction.

The vehicle body 10' includes: a transfer 22' coupled to the transmission 16 and configured to take out driving force to be transmitted to the front wheels 12F; a coupling 28' included in the transfer 22' and configured to adjust the driving force to be distributed to the front wheels 12F and the rear wheels 12R; a front propeller shaft 30" coupled to the transfer 22' and extending toward the vehicle body front side; and the front wheel differential device 20 coupled to the front propeller shaft 30" and configured to transmit the driving force of the transfer 22' to the left and right front wheels 12F through the axles 18.

A front end portion of the rear propeller shaft 30' is coupled to the transfer 22' through a first universal joint 35', and a rear end portion of the rear propeller shaft 30' is coupled to the rear wheel differential device 26 through a second universal joint 36'. Further, a front end portion of the front propeller shaft 30" is coupled to the front wheel differential device 20 through a third universal joint 37', and a rear end portion of the front propeller shaft 30" is coupled to the transfer 22' through a fourth universal joint 38'.

The vehicle body 10' further includes the drive motor 40 arranged at the vehicle body front-rear direction middle portion as the driving source, and the drive motor 40 is provided so as to drive the rear propeller shaft 30'. The output of the drive motor 40 is transmitted from the rear propeller shaft 30' through the rear wheel differential device 26 to the rear wheels 12R and is also transmitted from the rear propeller shaft 30' through the transfer 22', the front propeller shaft 30", and the front wheel differential device 20 to the front wheels 12F.

As with the vehicle body 10, in the vehicle body 10', the drive motor 40 is arranged on the vehicle body front-rear direction middle portion of the propeller shaft 30', specifically on the vehicle body front-rear direction middle portion of the rear propeller shaft 30'. The propeller shaft 30' is supported with the vehicle body 10' through the drive motor 40 by the vehicle body front-rear direction middle portion of the propeller shaft 30' being supported with the drive motor 40.

According to the present embodiment, in the hybrid vehicle 10' including: the engine 14 arranged at the vehicle body front portion; the propeller shaft 30' configured to transmit the output of the engine 14 to the rear wheels 12R; and the drive motor 40 provided so as to drive the propeller shaft 30' and supported with the vehicle body 10', the propeller shaft 30' is supported with the drive motor 40, and with this, supported with the vehicle body 10 through the drive motor 40. Similarly, in a hybrid vehicle including: an engine arranged at a vehicle body rear portion; a propeller shaft configured to transmit an output of the engine to front wheels; and a drive motor provided so as to drive the propeller shaft and supported with a vehicle body, the propeller shaft can be supported with the drive motor, and with this, supported with the vehicle body through the drive motor.

The hybrid vehicle 10' according to Embodiment 2 is a four-wheel drive vehicle manufactured based on a front engine-rear drive vehicle. However, even in a front engine-rear drive two-wheel drive vehicle in which the engine is arranged at the vehicle body front portion; and the output of the engine is transmitted to the wheels arranged at the vehicle body rear portion, the propeller shaft can be supported with the drive motor, and with this, supported with the vehicle body through the drive motor.

As above, the hybrid vehicle 10' according to the present embodiment includes: the engine 14 arranged at one of the vehicle body front portion and the vehicle body rear portion; the propeller shaft 30' configured to transmit the output of the engine 14 to the wheels 12R arranged at the other of the vehicle body front portion and the vehicle body rear portion; and the drive motor 40 provided so as to drive the propeller shaft 30' and supported with the vehicle body 10. The propeller shaft 30' is supported with the vehicle body 10' through the drive motor 40 by the vehicle body front-rear direction middle portion of the propeller shaft 30' being supported with the drive motor 40.

With this, in the hybrid vehicle 10' including the propeller shaft 30' extending in the vehicle body front-rear direction, the propeller shaft 30' is supported with the vehicle body 10' through the drive motor 40 supported with the vehicle body 10'. Therefore, the support structure supporting the propeller shaft 30' with the vehicle body 10' is made simpler than a case where the propeller shaft and the drive motor are individually supported with the vehicle body. Further, since the vehicle body front-rear direction middle portion of the propeller shaft 30' is supported, the propeller shaft 30' is stably supported.

According to the present embodiment, in the hybrid vehicle 10' including the propeller shaft 30' extending in the vehicle body front-rear direction, the propeller shaft 30' is supported with the vehicle body 10' through the drive motor 40 by the middle portion of the propeller shaft 30' being supported with the drive motor 40. However, in the vehicle including the power generator instead of the drive motor 40, the propeller shaft can be supported with the power generator, and with this, supported with the vehicle body through the power generator.

In the above embodiments, the vehicle body front-rear direction middle portion of the propeller shaft is supported. However, a portion of the propeller shaft which portion is offset from the vehicle body front-rear direction middle portion toward the vehicle body front side or the vehicle body rear side may be supported. A vehicle body front-rear direction substantially middle portion of the propeller shaft can be supported as long as the propeller shaft is stably supported, the vehicle body front-rear direction substantially middle portion including a portion offset from the vehicle body front-rear direction middle portion toward the vehicle body front side or the vehicle body rear side.

The present invention is not limited to the illustrative embodiments, and various modifications and design changes may be made within the scope of the present invention.

INDUSTRIAL APPLICABILITY

As above, according to the present invention, the support structure supporting the propeller shaft with the vehicle body of the vehicle, such as the hybrid vehicle, including the propeller shaft is made simple. Therefore, the present invention may be suitably utilized in an industrial field of manufacture of this type of vehicles.

REFERENCE CHARACTER LIST 2 floor panel
4 tunnel portion
10, 10' vehicle body
12F, 12R wheel
14 engine
16 transmission
20, 26 differential device
22, 22' transfer
28, 28' coupling
30, 30', 30" propeller shaft
40 drive motor
45 casing portion
47, 52 bearing portion
48 stator
49 rotor
50 motor portion
53 speed reducer portion
62 exhaust treatment device
66 fuel tank
68 battery

The invention claimed is:

1. A hybrid vehicle comprising:
an engine arranged at a vehicle body front portion or at a vehicle body rear portion;
a propeller shaft extending in a vehicle body front-rear direction and configured to transmit an output of the engine to wheels arranged at the other of the vehicle body front portion and the vehicle body rear portion; and
a drive motor provided so as to drive the propeller shaft and supported with the vehicle body,
the propeller shaft transmitting an output of the drive motor to wheels which are arranged at at least one of the vehicle body front portion and the vehicle body rear portion, wherein
the propeller shaft is supported with the vehicle body through the drive motor by a middle portion of the propeller shaft in the vehicle body front-rear direction being supported with the drive motor;
a floor cross member extending in a vehicle width direction is joined to a floor panel of the vehicle body; and
the floor cross member and a support portion are arranged so as to at least partially overlap each other in the vehicle body front-rear direction, the support portion supporting the drive motor such that the drive motor is attached to the floor panel of the vehicle body.

2. The hybrid vehicle according to claim 1, wherein:
the drive motor includes
a motor portion including a stator and a rotor,
a casing portion accommodating the motor portion, and
bearing portions provided at both respective vehicle body front-rear direction end portions of the casing portion; and
the propeller shaft is inserted into and supported with the bearing portions, and with this, supported with the vehicle body through the drive motor.

3. The hybrid vehicle according to claim 2, wherein:
the drive motor includes a speed reducer portion in the casing portion, the speed reducer portion being configured to decelerate rotation of the rotor of the motor portion and transmit the rotation of the rotor to the propeller shaft; and
the motor portion and the speed reducer portion are provided on the propeller shaft so as to be lined up in the vehicle body front-rear direction.

4. The hybrid vehicle according to claim 2, wherein:
the hybrid vehicle is a four-wheel drive vehicle manufactured based on a front engine-front drive vehicle in which the engine is arranged at the vehicle body front portion, and the output of the engine is transmitted to wheels arranged at the vehicle body front portion; and
the propeller shaft is provided so as to couple a transfer and a coupling, the transfer being provided on axles of the wheels arranged at the vehicle body front portion and being configured to take out driving force to be transmitted to wheels arranged at the vehicle body rear portion, the coupling being arranged at the vehicle body rear portion and being configured to adjust driving force to be distributed to the wheels arranged at the vehicle body front portion and the wheels arranged at the vehicle body rear portion.

5. The hybrid vehicle according to claim 2, wherein:
the hybrid vehicle is a front engine-rear drive vehicle in which the engine is arranged at the vehicle body front portion, and the output of the engine is transmitted to the wheels arranged at the vehicle body rear portion, or the hybrid vehicle is a four-wheel drive vehicle manufactured based on the front engine-rear drive vehicle; and
the propeller shaft is provided so as to couple a transmission and a wheel differential device, the transmission being coupled to the engine and arranged at the vehicle body front portion, the wheel differential device being arranged at the vehicle body rear portion.

6. The hybrid vehicle according to claim 2, wherein:
the engine is arranged at the vehicle body front portion;
an exhaust treatment device is provided at a vehicle body rear side of the engine;
a fuel tank is provided at a vehicle body front side of axles of the wheels arranged at the vehicle body rear portion; and
the drive motor is located between the exhaust treatment device and the fuel tank in the vehicle body front-rear direction and arranged inside a tunnel portion which is provided at a vehicle width direction middle portion of the floor panel and is open at a lower side of the tunnel portion.

7. The hybrid vehicle according to claim 2, wherein:
the engine is arranged at the vehicle body front portion;
an exhaust treatment device is provided at a vehicle body rear side of the engine;

a battery is provided at a vehicle body front side of axles of the wheels arranged at the vehicle body rear portion; and the drive motor is located between the exhaust treatment device and the battery in the vehicle body front-rear direction and arranged inside a tunnel portion which is provided at a vehicle width direction middle portion of the floor panel and is open at a lower side of the tunnel portion.

8. The hybrid vehicle according to claim 3, wherein:

the hybrid vehicle is a four-wheel drive vehicle manufactured based on a front engine-front drive vehicle in which the engine is arranged at the vehicle body front portion, and the output of the engine is transmitted to wheels arranged at the vehicle body front portion; and the propeller shaft is provided so as to couple a transfer and a coupling, the transfer being provided on axles of the wheels arranged at the vehicle body front portion and being configured to take out driving force to be transmitted to wheels arranged at the vehicle body rear portion, the coupling being arranged at the vehicle body rear portion and being configured to adjust driving force to be distributed to the wheels arranged at the vehicle body front portion and the wheels arranged at the vehicle body rear portion.

9. The hybrid vehicle according to claim 3, wherein:

the hybrid vehicle is a front engine-rear drive vehicle in which the engine is arranged at the vehicle body front portion, and the output of the engine is transmitted to the wheels arranged at the vehicle body rear portion, or the hybrid vehicle is a four-wheel drive vehicle manufactured based on the front engine-rear drive vehicle; and the propeller shaft is provided so as to couple a transmission and a wheel differential device, the transmission being coupled to the engine and arranged at the vehicle body front portion, the wheel differential device being arranged at the vehicle body rear portion.

10. The hybrid vehicle according to claim 3, wherein:

the engine is arranged at the vehicle body front portion;
an exhaust treatment device is provided at a vehicle body rear side of the engine;
a fuel tank is provided at a vehicle body front side of axles of the wheels arranged at the vehicle body rear portion; and
the drive motor is located between the exhaust treatment device and the fuel tank in the vehicle body front-rear direction and arranged inside a tunnel portion which is provided at a vehicle width direction middle portion of the floor panel and is open at a lower side of the tunnel portion.

11. The hybrid vehicle according to claim 3, wherein:

the engine is arranged at the vehicle body front portion;
an exhaust treatment device is provided at a vehicle body rear side of the engine;
a battery is provided at a vehicle body front side of axles of the wheels arranged at the vehicle body rear portion; and
the drive motor is located between the exhaust treatment device and the battery in the vehicle body front-rear direction and arranged inside a tunnel portion which is provided at a vehicle width direction middle portion of the floor panel and is open at a lower side of the tunnel portion.

12. The hybrid vehicle according to claim 1, wherein:

the hybrid vehicle is a four-wheel drive vehicle manufactured based on a front engine-front drive vehicle in which the engine is arranged at the vehicle body front portion, and the output of the engine is transmitted to wheels arranged at the vehicle body front portion; and the propeller shaft is provided so as to couple a transfer and a coupling, the transfer being provided on axles of the wheels arranged at the vehicle body front portion and being configured to take out driving force to be transmitted to wheels arranged at the vehicle body rear portion, the coupling being arranged at the vehicle body rear portion and being configured to adjust driving force to be distributed to the wheels arranged at the vehicle body front portion and the wheels arranged at the vehicle body rear portion.

13. The hybrid vehicle according to claim 12, wherein:

the engine is arranged at the vehicle body front portion;
an exhaust treatment device is provided at a vehicle body rear side of the engine;
a fuel tank is provided at a vehicle body front side of axles of the wheels arranged at the vehicle body rear portion; and
the drive motor is located between the exhaust treatment device and the fuel tank in the vehicle body front-rear direction and arranged inside a tunnel portion which is provided at a vehicle width direction middle portion of the floor panel and is open at a lower side of the tunnel portion.

14. The hybrid vehicle according to claim 12, wherein:

the engine is arranged at the vehicle body front portion;
an exhaust treatment device is provided at a vehicle body rear side of the engine;
a battery is provided at a vehicle body front side of axles of the wheels arranged at the vehicle body rear portion; and
the drive motor is located between the exhaust treatment device and the battery in the vehicle body front-rear direction and arranged inside a tunnel portion which is provided at a vehicle width direction middle portion of the floor panel and is open at a lower side of the tunnel portion.

15. The hybrid vehicle according to claim 1, wherein:

the hybrid vehicle is a front engine-rear drive vehicle in which the engine is arranged at the vehicle body front portion, and the output of the engine is transmitted to the wheels arranged at the vehicle body rear portion, or the hybrid vehicle is a four-wheel drive vehicle manufactured based on the front engine-rear drive vehicle; and the propeller shaft is provided so as to couple a transmission and a wheel differential device, the transmission being coupled to the engine and arranged at the vehicle body front portion, the wheel differential device being arranged at the vehicle body rear portion.

16. The hybrid vehicle according to claim 15, wherein:

the engine is arranged at the vehicle body front portion;
an exhaust treatment device is provided at a vehicle body rear side of the engine;
a fuel tank is provided at a vehicle body front side of axles of the wheels arranged at the vehicle body rear portion; and
the drive motor is located between the exhaust treatment device and the fuel tank in the vehicle body front-rear direction and arranged inside a tunnel portion which is provided at a vehicle width direction middle portion of the floor panel and is open at a lower side of the tunnel portion.

17. The hybrid vehicle according to claim 15, wherein:

the engine is arranged at the vehicle body front portion;

an exhaust treatment device is provided at a vehicle body rear side of the engine;

a battery is provided at a vehicle body front side of axles of the wheels arranged at the vehicle body rear portion; and the drive motor is located between the exhaust treatment device and the battery in the vehicle body front-rear direction and arranged inside a tunnel portion which is provided at a vehicle width direction middle portion of the floor panel and is open at a lower side of the tunnel portion.

18. The hybrid vehicle according to claim 1, wherein:

the engine is arranged at the vehicle body front portion;

an exhaust treatment device is provided at a vehicle body rear side of the engine;

a fuel tank is provided at a vehicle body front side of axles of the wheels arranged at the vehicle body rear portion; and the drive motor is located between the exhaust treatment device and the fuel tank in a vehicle body front-rear direction and arranged inside a tunnel portion which is provided at a vehicle width direction middle portion of the floor panel and is open at a lower side of the tunnel portion.

19. The hybrid vehicle according to claim 1, wherein:

the engine is arranged at the vehicle body front portion;

an exhaust treatment device is provided at a vehicle body rear side of the engine;

a battery is provided at a vehicle body front side of axles of the wheels arranged at the vehicle body rear portion; and the drive motor is located between the exhaust treatment device and the battery in the vehicle body front-rear direction and arranged inside a tunnel portion which is provided at a vehicle width direction middle portion of the floor panel and is open at a lower side of the tunnel portion.

20. The hybrid vehicle according to claim 1, wherein vehicle body front-rear direction is parallel to a long axis of the vehicle.

21. A vehicle comprising:

an engine arranged at a vehicle body front portion or at a vehicle body rear portion;

a propeller shaft extending in a vehicle body front-rear direction and configured to transmit an output of the engine to wheels arranged at the other of the vehicle body front portion and the vehicle body rear portion; and a power generator provided so as to be driven by the propeller shaft and supported with the vehicle body, wherein the propeller shaft is supported with the vehicle body through the power generator by a middle portion of the propeller shaft in the vehicle body front-rear direction being supported with the power generator;

a floor cross member extending in a vehicle width direction is joined to a floor panel of the vehicle body; and the floor cross member and a support portion are arranged so as to at least partially overlap each other in the vehicle body front-rear direction, the support portion supporting the power generator such that the power generator is attached to the floor panel of the vehicle body.

* * * * *